Patented Sept. 8, 1942

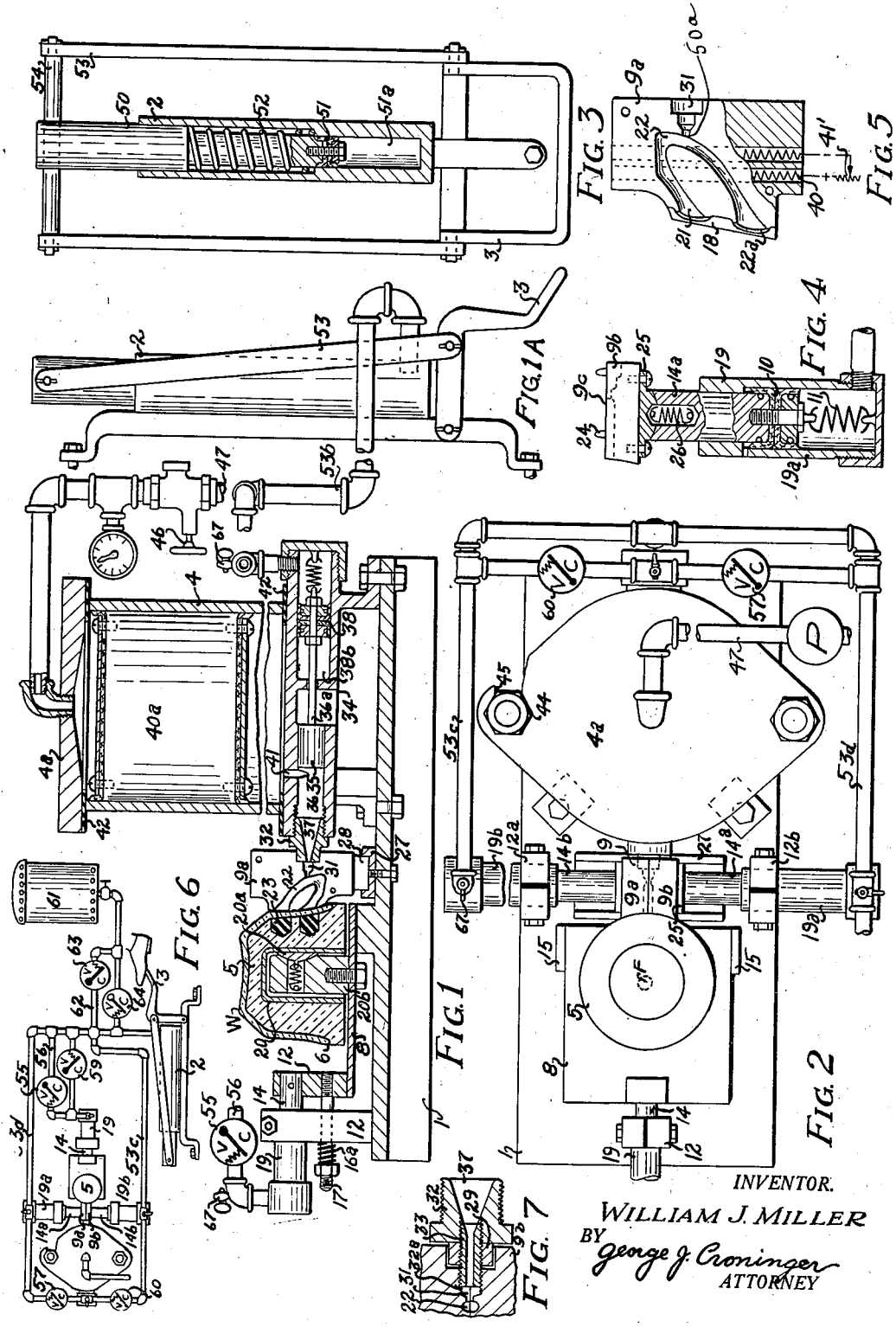

2,294,926

UNITED STATES PATENT OFFICE 2,294,926

MANUFACTURE OF APPENDAGED POTTERY WARE

William J. Miller, Swissvale, Pa.

Application March 15, 1937, Serial No. 131,026

17 Claims. (Cl. 25—22)

This invention relates to improvements in the manufacture of appendaged pottery ware. It has to do with a method of and apparatus for fabricating and attaching pottery appendages such as handles, protuberances and various other forms of superficial appendages to ware in the manufacture of pottery.

The invention contemplates the manufacture of appendaged potteryware from clay mass to completed product ready for the kiln. In the matter of forming and uniting the appendage with the ware, it is proposed to first prefabricate the ware and to form and unite the appendage therewith in one operation thereafter, plastic clay or clays of workable characteristics suitable for the process being utilized in the appendage. Furthermore, measures are taken to protect the ware against injury or breakage during the operation as well as measures designed to promote harmony in drying and shrinkage behavior of the united bodies.

Pottery appendages take many forms, perhaps the most common of which is the handle found on tea cups, pitchers, teapots and the like. In the case of jiggered ware, for instance cups, the ware is dried to leather hardness, topped, then sponged preparatory to applying the handle which is dipped in slip and stuck thereto by hand. The handle is formed separately in a mold and must be fettled, sponged and trimmed before it is ready to be applied to the ware.

Besides being slow and costly, there are certain other disadvantages to "sticking up by hand." For instance, it is difficult to manually locate the appendage on the ware and, being comparatively soft, the handle is easily deformed if the utmost care is not exercised. Furthermore, differences in drying and firing behavior are very easily apt to occur particularly where the ware on one hand is made of plastic clay and the appendage is cast from liquid slip. Where these factors are too greatly out of proportion, the appendage may warp or the terminals may become sprung where they are attached to the ware.

Generally stated, but subject to variation within the scope of the invention, it is herein contemplated that the preshaped, partly dried ware shall be sealed against the mouth of an appendage molding cavity in the zone of handle attachment and shall be supported over its entire internal surface area and reinforced in the zone of handle attachment to prevent fracture or breakage of the frangible ware from sealing as well as attaching pressures involved in joining the handle to the ware, the making and joining of the handle being accomplished by extruding clay under pressure into the handle forming cavity wherein it is shaped and the terminal portions attached to the ware by amalgamation or simple adhesion depending on the physical characteristics and composition of the clay and the pressures involved. After a predetermined molding and attaching interval during which the appendage clay may be subjected to dehydrating influences to any desired degree, the mold is removed from the appendage, the appendage having been separated therefrom by means of steam or vapor and the ware with the handle attached thereto is then set aside for drying.

The objects of this invention are to simplify pottery appendaging by forming and uniting the appendage to prefabricated ware in one quick operation not attended by any long interval of waiting whilst the appendage "sets" as in the case of making the appendages by slip casting. Another object is to improve the quality of the ware and the appendage by providing a better and stronger bond between the two and one which leaves no unsightly seam lines or cracks. Other objects are to minimize warped, distorted or deformed handles or appendages and prevent locating errors.

In the description and drawing corresponding reference characters designate corresponding parts and in the drawing:

Figs. 1 and 1a are a sectional elevation of a preferred form of apparatus for handling cups; and a pump respectively, arranged in side by side relation for illustrative purposes.

Fig. 2 is a top plan view of the apparatus of Fig. 1 with the pump omitted.

Fig. 3 is an elevation of the pump with the cylinder shown in section.

Fig. 4 is a detail in longitudinal section of one of the hydraulic piston assemblies, in this instance a die support and actuating device.

Fig. 5 is a detail of one of the dies, partly in section to disclose the heating element.

Fig. 6 is a diagram of the hydraulic system and

Fig. 7 is a section showing a modified form of extruding nozzle.

Although the invention is to be described in connection with the manufacture of handled cups, it is understood that the appendaging of ware of other shape and/or composition than that illustrated is contemplated as well as the manufacture and attachment of appendages of a design, configuration and composition different than that shown, all within the spirit and scope of the invention. Furthermore, the machine illustrated is not limited in its use to making and applying open handles to cups and it is adaptable to appendaging ware of other shape and composition as well as the manufacture and attachment of handles of other design, configuration and/or composition and various other forms of appendages.

As regards the machine, the numeral 1, Figs. 1 and 2, designates the base on which the machine components are mounted and Fig. 1a shows a suction and pressure pump 2, by means of which the machine is hydraulically operated. The pump is located below a bench (not shown) on which the machine normally rests and operated by a foot pedal 3 leaving the operator's hands free to place and remove the ware.

The machine performs one complete handle making and attaching cycle incident to a full stroke of the pedal 3 causing the following operations to take place in sequence, to wit, the closing of the separable die or mold 9, the movement of the ware W into sealing engagement with the mouth 21 of the moulding cavity 22, the extrusion of clay into the cavity 22 and the shaping and joinder thereof to the ware, the opening of the mold and release of the handle and the retraction of the appendaged piece for removal from the machine.

The ware to be appendaged may be made by one of several processes, for instance, jiggering, casting, pressing, etc. In the case of jiggered and cast ware, the body should lend itself to the application of forces in compression without deformation incident to appendaging which would normally involve drying until a degree of hardness is reached when plastic deformation ceases. This degree of hardness may vary depending on the character, composition and consistency of the clay being worked and in the case of dry clays (low moisture content) drying may be omitted because the ware is substantially shape retaining at the time initial formation is completed.

In the interest of obtaining uniform shrinkage during drying and firing and the avoidance of distortion, separation, etc. subsequent to appendaging, it is desired that factors affecting shrinkage in the ware and handle at the time of consolidation be such as will promote these desiderata. This may involve one or several factors including moisture content, consistency, coefficient of expansion temperature composition and other factors not specifically mentioned. In the case of jiggered ware, for example, the same clay as used in making the ware may be used for appendaging purposes or even for appendaging cast ware. This avoids the necessity of preparing a special mix.

The cup illustrated may have been formed by jiggering, casting or pressing and for the purpose of illustration it will be assumed that the cup has been jiggered from plastic clay. The appendage, in this instance a cup handle, is preferably made from clay having the same characteristics as the body of the prefabricated cup, however, the moisture content in the appendage clay may be increased over that in the cup to provide an excess for vaporization purposes in the release of the appendage from the imperforate walls of the appendage mold. An increase in moisture of the appendage clay also facilitates the movement of the clay through the pressure chamber. The appendage clay may also have the same percentage of moisture as in the prefabricated body at the time of appendaging.

The cup or article to be appendaged should be reliably supported and reinforced in the zone of handle attachment to avoid breakage or distortion under the pressures involved in attaching the handle thereto and sealing the cup against the mouth of the handle cavity. Very high pressures corresponding with those used in dry pressing will be required in appendaging dry press ware and correspondingly lower pressures with the more plastic adhesive jiggering clay. Also, in the interest of avoiding ware breakage and the leakage of handle clay between the surfaces in sealing engagement, the cup is floatingly mounted as well as the die sections so that the surfaces may obtain limited relative movement in closing.

The preferred form of device on which the cup is mounted is designated by the numeral 5 which takes the shape of the internal contour of the cup and has a ledge 6 against which the lip of the cup may rest for heightwise locating purposes. The form 5 is properly mounted on a floating thrust shoe 20 having a ball and socket connection 20a with a demountable block 20b thereby affording means for compensating for variations in the angle of engaging surfaces of the cup and die. To unequally load the frangible cup body in compression in the zone adjacent the zone or zones of handle attachment would tend toward distorting or breaking the ware. However, the form 5 may also be rigidly mounted if desired.

To "backup" or reinforce the cup body in the zone of handle application as illustrated by the terminal portions or mouths 21 of the handle cavity 22, the form is provided with yieldable pressure equalizing inserts 23 (which may be a continuous block of material if desired). As a further precaution against clay leakage, the mouths 21 of the handle cavity 22 may be rimmed as at 22a, Fig. 5, if desired.

The form 5 and mounting facilities are supported by plate 8 which occupies a retracted position to the left of that shown in Fig. 1 for cup placement and removal thereby avoiding interference with the die. The plate 8 is mounted on the projecting end of a piston 14, Fig. 4, provided with a double head seal 10 inside the vented cylinder 19 and a retracting spring 11. The cylinder is supported by a clamping bracket 12 and is connected by fluid pressure line with the pump 2 which will be later described. When the form 5 is shifted to the right to bring the ware into engagement with the die, guides 15 assist in centering the ware and spring 16a on limit stud 17, Fig. 1, retards the movement of the piston near the end of the thrust stroke to reduce impact between the war and the sealing surface 18 of the die and promotes the gradual application of the sealing pressure. A sharp impact might possibly crack the ware body.

The die 9 is preferably made in two sections 9a and 9b for handle releasing purposes and the engaging surfaces 9c are faced to insure good sealing engagement adjacent the cavity and indexing pins 24 are provided for aligned closing registration. The die or mold sections are mounted on oppositely disposed pistons 14a and 14b respectively, each having an hydraulic actuating cylinder assembly 19a and 19b respectively, Fig. 4, supported by clamping brackets 12a and 12b. The operation of these pistons in connection with the operation of the machine will be hereinafter taken up.

To compensate for variation in closing angle and also to insure correct alignment of the sealing surface 18 with the external surface of the cup, each mold section is mounted on a floating thrust shoe 25 held in associated relation with their respective pistons by a spring 26. These mold sections move into closed relation before the cup is sealed against the mouth of the mold cavity and are adapted to be retracted prior to withdrawal of the cup. Guides 27 in which the foot 28 of each thrust shoe 25 works, Fig. 1, prevent major lateral misalignment of the die sections in closing.

When closed, the mold provides a molding cavity 22 which may be of any desired shape, configuration or design and may have one or more mouths as at 21, bellmouthed, rimmed as in the present instance, or otherwise.

Clay is extruded into the cavity 22 through a shouldered extrusion inlet 31 and by threading the walls thereof as at 32a, gripping and sealing relation may be established with a threaded nipple 33 forming part of an injector nozzle 32 when the die is closed to thereby prevent clay leakage. A locking and locating collar 29 screwed on the nipple 33 assists in centering the die sections around the nozzle (see Fig. 7).

Charges of plastic clay are extruded into the molding cavity 22 by plunger feeder 34 provided with a ram 35 operating in clay chamber 36, and having a stem 36a on which a double sealed piston head 38 is mounted, the latter lying within cylinder 38b for hydraulic actuation on the thrust stroke and being spring retracted on the return stroke. The piston and cylinder assembly is substantially the same as that shown in Fig. 4 and has fluid connections with the pump 2.

On the left hand or forward thrust of the ram 35, Fig. 1, the clay in chamber 36 is forced through the reducing orifice 37 and compacted and densified as it passes therethrough, enters and fills the molding cavity 22 and flows against the cup in the zone of the terminal portions 21. The compressive effort of the ram is capable of being varied, depending on the character and consistency of the clay being worked and the pressure required to mold and attach it to the ware. Relatively soft clays which flow easily and are inherently adhesive will not require the pressure necessary to mold and attach appendages made from comparatively dry low moisture content clays. The appendaging of dry pressed ware is contemplated by this invention, and if desired, the moisture content of the ware may be raised before it is appendaged, should it be necessary to increase the moisture content of the appendage clay. The intensity of the terminal pressure will determine then whether the adhering relationship between the appendage and ware shall reach the proportions of amalgamation or simple adhesion, or a combination of both.

In the case where the handle is fabricated from ordinary jigger clay which is prepared in slug form and charged into the cylinder 4 in elongated billets, the moisture content may be higher than the clay in the article to be appendaged at the time the appendage clay passes through the feeder, however, excess moisture in this event would be extracted by applying heat in proper degree thereto incident to molding, thereby promoting the evaporation of moisture and dehydration of the clay when the mold is opened. Due to the concentration of heat, evaporation is comparatively rapid and causes the surface zone of the appendage to dry out and thus forms a stabilizing shell which is to a certain extent responsible for shape stabilization. It is desired that regardless of the degree of plasticity of the clay during the interval of formation and attachment plastic deformation shall not occur after the appendage is released from the mold.

Each mold section is provided with a heating element 40 controlled preferably by individual thermostats or if desired by rheostat 41' common to both for temperature regulating purposes. The molds are operated at a temperature which will induce the separation of the appendaged clay from the walls of the molding cavity and this is occasioned by generating a fluid film (vapor or steam) from the moisture in the handle clay. The application of high heat to the handle clay obviously involves dehydration and the degree to which this is promoted is dependent on the temperature applied and the dwell; extremely wet mixtures may be dehydrated appreciably incident to molding, however, it is preferred that the moisture content of the handle clay closely approximate the moisture content in the ware at the time of molding so as to require a minimum application of heat and extraction of moisture.

In the case of comparatively dry clays, heat may be dispensed with and a permeable die or mold used, suction being applied to the clay to evacuate air pockets incident to molding and compressed air being discharged through the die sections for releasing purposes. These provisions may also be adopted, if desired, in connection with the manufacture of handles from plastic clay. It is understood that the present apparatus may be used in what is termed as "dry pressing" wherein clay in the form of dust or finely divided particles is amalgamated under high pressures into a desired shape, the resulting product (appendage) having the characteristics of high tensile strength and low coefficient of expansion.

Referring to Fig. 1, the ram chamber 36 is automatically refilled after a full stroke of the ram by maintaining a pressure head on the piston 40a sufficient to cause the clay in the cylinder 4 to extrude through conduit 41 into the ram chamber. The cylinder 40 has sealing rings 42 at the top and bottom to prevent clay and air leakage respectively, the cylinder being drawn down tightly against the base by retaining nuts 44, Fig. 2, which retain the domed top plate 4a in place. The plate is slotted at 45 so that it may be swung out of the way incident to recharging the cylinder 4 with clay by telescoping a billet of clay thereinto aand turning the cylinder upside down and replacing it so that the piston 40a will be in the upper position. The cylinder 4 could of course be removed and the piston 40a pushed back to the original position and a billet of clay charged into the open end of the cylinder. When all the connections are again tightened, the operator can restore the pressure inside the cylinder by opening valve 46 in line 47 which is connected to any suitable source of pressure. It is preferred herein to connect the line 47 with a separate compressor P and to not utilize the pump 2 for this purpose.

The layout of the hydraulic system is shown in Fig. 6, the pump being disposed in the position which it will normally occupy, convenient to the operator's foot. The pump comprises a shouldered piston 50 with a double head seal 51 and a return spring 52. On the working stroke, the piston is moved by a pivoted pedal 3 connected thereto by straps 53 and a cross pin 54 through the piston head. As the pedal approaches the end of travel it nears dead center and applies maximum pressure at the termination of the molding and attaching operation to provide for a high terminal pressure.

The hydraulic system operates in the following manner; the pump piston 50 forces the fluid in cylinder 51a through fluid line 53b, branches 53c and 53d into cylinders 19a and 19b. This causes the mold sections 9a and 9b to close and as the pressure increases, valve 55 in line 56 opens and piston 14 is projected moving the ware into sealing engagement with the mold and as the pressure increases further the valve 57 in line 54a opens and the ram 35 charges the molding cavity with clay and effects the attachment of the appendage thus formed to the ware.

The dwell period incident to the making and attachment of the handle will depend on the character of the clay and the ease with which it may be molded and attached, the operator holding the pedal down until his judgement dictates the release thereof. It is understood that whilst the clay is being molded it is subjected to dehydrating influences (heat in the present instance) which will promote the separation of the clay from the walls of the molding cavity when the partible mold is opened.

Upon release of the pedal 3, the piston is withdraw by spring 52, reducing the pressure in all of the lines and springs 11 immediately retract pistons 14a and 14b exposing the handle to atmosphere and in the event the temperature applied to the clay is sufficiently high, dehydration will take place to a predetermined extent and for a predetermined interval. The appendage is of course at this time attached to the ware and upon further reduction of pressure in the lines, the valve 59 opens and piston 14 is withdrawn, retracting the cup and appendage from the nozzle, the small neck in the zone 31 adjacent the nozzle parting and leaving a stub on the handle which is removed by the finisher. Either prior to or coincidently with the opening of the die, valve 60 opens and ram 35 is retracted releasing the pressure on the clay in the molding chamber. This also sucks the clay in the injector nozzle back into the chamber 36, thus assisting in parting the neck from the appendage and prevents the exposure thereof to atmosphere and consequent hardening should a period of idleness ensue thereafter. As the ram head 35 clears the inlet 41, a fresh charge of clay enters the ram chamber, however, at a low pressure not sufficient to extrude through the injector nozzle. In the case of stiff clays requiring high pressure to flow, the nozzle could be provided with a closure member.

A fluid reservoir is provided at 61 for replenishing the hydraulic system and a check valve 64 controls the withdrawal of fluid therefrom. An adjustable overload spring pressed valve 63 located in a bypass 62 is provided to limit the terminal pressure and dissipate excess pressure. It is intended that all of the valves just mentioned be adjustable spring pressed check valves and that the various fluid lines be provided with vent valves 67 to bleed off entrapped air.

It is understood, however, that the hydraulic system may be replaced by cam and lever or other equivalent operating components to actuate the machine.

Such further processing as the ware will receive after it has been appendaged will depend on the character of the ware, however, as far as immediate processing is concerned, the handle will be sponged and the stub removed, after which the ware will undergo further drying until it reaches what is known as the "green dried" stage.

The machine may be adapted to simultaneously applying a plurality of appendages to a single piece of ware as in the case of bullion cups which have oppositely disposed handles. This could be accomplished by providing two partible dies instead of one and mounting the same in opposition. The machine may also be adapted to appendaging a multiple of ware shapes simultaneously by simply mounting a multiple of forms 5 laterally of the plate 8, Fig. 2, and increasing the number of feeders, and dies correspondingly. If desired, one feeder could be utilized with branch lines to a plurality of individual injector nozzles, the latter being preferred where all the appendages will be of the same character and design. On the other hand, where the production is diversified, individual feeders and clay cylinders 4 may be used.

This invention contemplates also the operation of the machine in the manufacture of appendages only. According to present manual practice, several handles are cast simultaneously in a mold from which they are removed, fettled, sponged, trimmed to the contour of the cup and stacked on trays to await subsequent sticking up. The present machine adapted only for making handles would save the expense of casting molds, casting labor, trimming and damp storage. To accomplish this, the form 5 could be replaced by a steel form preferably heated against which the handle is extruded and to which it is caused to temporarily adhere and from which it is removed after the mold has been opened. Thus the handle could be contoured, reduced to a condition where plastic deformation would cease and applied to the ware immediately upon removal from the form 5, only the matter of "sticking up" being performed by hand.

The present invention also contemplates the manufacture of ware with integral appendage or appendages by providing dies 9a and 9b having molding cavities which define not only the handle but the ware. In this case, clay would not only be extruded into the handle molding chamber but also into the ware molding chamber, the latter through an inlet located generally in the zone F, Fig. 2. The most advantageous use of a machine of this nature would probably be in connection with the manufacture of dry pressed ware.

Where in the appended claims the term "support" appears in designation of the device upon which the ware is supported (form 5) whilst undergoing appendaging, it shall be understood as meaning a means which will provide wall support to the ware and reinforcement or "backing up" thereof in the zone or zones of appendage attachment and also assist in locating the ware relative to the die.

Having thus described my invention what I claim is:

1. In apparatus for appendaging potteryware, a device for supporting ware incident to appendaging comprising, a contoured body portion having a resilient insert lying adjacent the surface thereof for reinforcing the ware in the zone of appendage application.

2. Apparatus for appendaging potteryware which comprises, in combination, a backing up support for prefabricated ware, means for reciprocating the support, a partible mold, means for opening and closing said partible mold, a plunger feeder, a clay cylinder for supplying said feeder with clay and means for synchronizing the opening and closing of the partible mold with the movement of the support.

3. Apparatus for appendaging potteryware which comprises, in combination, movable support for the ware to be appendaged, a partible mold having means for opening and closing the same mounted adjacent said support, said mold having a cavity defining an appendage, a feeder located adjacent said mold and having a nozzle member adapted to be encompassed by and gripped in sealing engagement with said mold, means for causing said feeder to intermittently extrude charges of clay into the molding cavity of said mold, and means for charging the feeder with clay.

4. Apparatus for the manufacture of potteryware comprising, in combination, a support on which ware to be appendaged is disposed, a reciprocable carrier on which said support is floatingly mounted, a partible mold having molding cavity therein for the appendage adapted to co-operate with said support in the appendaging of the ware, means for opening and closing said partible mold sections and said support comprising hydraulic cylinder and piston assemblies, a feeder for charging the molding cavity of said mold with clay, a fluid pressure means for actuating said feeder, means for supplying said feeder with clay, a pump, fluid lines connecting said pump with said cylinder and piston assemblies and feeder actuating means, valves in said fluid lines to control the initiation and actuation of said cylinder and piston assemblies, means for heating said partible mold sections, control means for said heating means, means for locating said partible mold sections relative to the nozzle of said feeder, means for sealing said partible mold sections in gripping relation with said nozzle, said apparatus being of such a nature that the ware to be appendaged is moved against and sealed with relation to the mold and is reinforced in the zone of sealing and located relative to such zone and clay is extruded into the molding cavity in the presence of heat, formed and attached to the ware, separated from the walls of the molding cavity which is opened to release the appendage for withdrawal of the ware and appendage.

5. In combination, a partible mold for making appendages comprising separable movably mounted sections, a movably and resiliently mounted ware support for ware transportation and backing up purposes incident to appendaging, means for opening and closing said mold sections, means for moving said ware support into and out of co-operation with said mold sections, a source of clay and mechanism for extruding measured amounts of clay into the molding cavity of said mold.

6. In combination, an appendage mold comprising movably mounted separable sections, mechanism for opening and closing said sections, a movably mounted ware support provided with ware backing up means, mechanism for co-operating said mold support with said mold sections, a source of clay supply and means for flash hardening the appendage.

7. In combination, an appendage mold comprising movably mounted sections forming an appendage molding cavity therebetween, mechanism for opening and closing said mold, a movably mounted ware support for ware transportation to and from the appendage mold and for backing up purposes incident to appendaging, mechanism for advancing and retracting said support relative to said mold, means for predetermining the travel of said support, mechanism for filling said molding cavity with clay to form and attach an appendage to the ware and means for controlling the sequential operation of said mechanism.

8. A support for use in appendaging potteryware comprising, a contoured body portion having a yieldable portion in the zone of appendage application.

9. In apparatus for appendaging prefabricated potteryware, the combination of a support for internally backing up the ware in back of the zone of appendage attachment, a partible appendage mold having a cavity defining an appendage, said cavity having at least one mouth opposing the support and defining the terminal portion of the appendage, means for co-operating the support and appendage mold for the purpose of engaging the ware with the mouth of the molding cavity, means for forcing clay into the appendage cavity and against the re-enforced zone of the ware to attach the appendage thereto, means for separating the clay from the wall of the molding cavity and means for opening and closing the appendage mold.

10. Apparatus for forming and applying appendages to prefabricated potteryware having, in combination, a support on which the prefabricated ware is disposed, there being engagement between the external surface of the support and the internal surface of the ware so as to back up the ware over the entire zone of the terminal portion or portions of the appendage, an appendage mold, means for relatively moving the support and appendaged mold to grip the ware therebetween, means for charging the appendage mold with plastic clay and means for separating the clay from the wall of the molding cavity.

11. Apparatus for forming and applying appendages to prefabricated potteryware having, in combination, a support on which the ware is disposed, there being engagement between the support and the surface of the ware complemental thereto so as to back up the ware in the zone of appendage attachment, an appendage mold having a molding cavity which terminates at the exterior of the mold in a mouth, means for relatively moving said support and appendage mold to bring the ware into cooperation with the mouth of the molding cavity, means for charging the mold with plastic clay and means for flash hardening the clay.

12. A method of manufacturing potteryware which comprises, preforming the article of ware, thereafter molding and uniting an appendage thereto and flash hardening the appendage.

13. A method of manufacturing potteryware which comprises, preforming the article of ware, thereafter molding and uniting an appendage thereto by forcing plastic clay under pressure into a molding cavity, the walls of which are non-adhesive to clay, commencing the dehydration of the appendage whilst in the mold and thereafter removing the appendage from the mold and drying the consolidated product.

14. A method of appendaging pottery ware which comprises, forcing plastic clay under pressure into a molding cavity in the presence of heat and concurrently forming the appendage, attaching it to an article of ware and vaporizing sufficient liquid constituents to stabilize the shape of the appendage and permit immediate withdrawal of all support for the appendage other than that provided by the ware.

15. The method of appendaging pottery ware which comprises forming the appendage of deformable plastic clay, prematurely hardening at least the outer surface portion of the appendage concurrently with molding by the application of heat thereto to thereby stabilize the shape of the appendage and permit the immediate withdrawal of all support therefrom except that afforded by the ware.

16. A method of manufacturing pottery ware which comprises, molding a body of deformable plastic ceramic material in the presence of heat at a value sufficient to vaporize liquid constituents of the said material and vaporizing sufficient moisture to stabilize the shape imparted to the material so that said material may be immediately removed from further support by the mold.

17. The method of appendaging preformed pottery ware with a mold having a molding cavity provided with an inlet and an outlet spaced therefrom defining the terminal portion of the appendage which comprises, pressing the ware into sealing engagement with the surface of the mold surrounding the outlet, forcing plastic clay under pressure into the molding cavity and against the ware and causing the clay to become attached thereto, and whilst in associated relation with the mold, reinforcing all of that portion of the article under sealing and clay pressures to thereby prevent fracture or breakage of the ware from such pressure.

WILLIAM J. MILLER.